United States Patent
Ai et al.

(10) Patent No.: US 9,592,558 B2
(45) Date of Patent: Mar. 14, 2017

(54) DUAL TIP CUTTER AND METHOD OF HARD TURNING

(71) Applicant: The Timken Company, North Canton, OH (US)

(72) Inventors: Xiaolan Ai, Massillon, OH (US); Xiaozhong Song, Solon, OH (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 14/653,906

(22) PCT Filed: Dec. 13, 2013

(86) PCT No.: PCT/US2013/074915
§ 371 (c)(1),
(2) Date: Jun. 19, 2015

(87) PCT Pub. No.: WO2014/099648
PCT Pub. Date: Jun. 26, 2014

(65) Prior Publication Data
US 2015/0343536 A1 Dec. 3, 2015

Related U.S. Application Data

(60) Provisional application No. 61/739,176, filed on Dec. 19, 2012.

(51) Int. Cl.
*B23B 27/00* (2006.01)
*B23B 27/16* (2006.01)
(Continued)

(52) U.S. Cl.
CPC ........ *B23B 27/1685* (2013.01); *B23B 27/145* (2013.01); *B23B 27/1659* (2013.01);
(Continued)

(58) Field of Classification Search
CPC .... B23B 27/1685; B23B 27/145; B23B 29/24
See application file for complete search history.

(56) References Cited

U.S. PATENT DOCUMENTS 2,679,679 A * 6/1954 Metzler .................. B23B 27/08
407/117
2,693,019 A 11/1954 Greenleaf
(Continued)

FOREIGN PATENT DOCUMENTS

CN 2483126 3/2002
CN 201760611 3/2011
(Continued)

OTHER PUBLICATIONS

International Search Report for International Appl. No. PCT/US2013/074915, dated Feb. 26, 2014, 6 pages.
(Continued)

*Primary Examiner* — Will Fridie, Jr.
(74) *Attorney, Agent, or Firm* — Michael Best & Friedrich LLP (57) ABSTRACT

A dual tip cutter (10) includes a body (12) defining a feed direction (F), a cutting direction (C) perpendicular to the feed direction, and a depth direction (D) perpendicular to both feed and cutting directions. A first cutting portion (35) is fixed relative to the body at a body first end. A second cutting portion (45) is fixed relative to the body at the body first end, adjacent the first cutting portion. The first and second cutting portions are stacked in the cutting direction so that the first cutting portion forms a leading cutting portion and the second cutting portion forms a trailing cutting portion for simultaneous cutting. The second cutting portion extends from the body further in the depth direction than the first cutting portion. A relative position between the first and second cutting portions is set such that a total chip (Continued)

load is shared between the first and second cutting portions in a predetermined ratio (K).

18 Claims, 9 Drawing Sheets

(51) Int. Cl.
*B23B 29/24* (2006.01)
*B23B 27/14* (2006.01)

(52) U.S. Cl.
CPC .......... *B23B 29/24* (2013.01); *B23B 2205/12* (2013.01); *B23B 2205/16* (2013.01); *B23B 2210/02* (2013.01); *B23B 2220/445* (2013.01); *B23B 2228/24* (2013.01); *B23B 2270/14* (2013.01); *Y10T 82/10* (2015.01); *Y10T 407/22* (2015.01); *Y10T 407/221* (2015.01); *Y10T 407/2208* (2015.01)

(56) References Cited

U.S. PATENT DOCUMENTS

| | | | |
|---|---|---|---|
| 3,383,748 A | | 5/1968 | Galimberti et al. |
| 3,399,442 A | | 9/1968 | Jones et al. |
| 3,504,413 A | | 4/1970 | Siewert et al. |
| 3,795,959 A | * | 3/1974 | Shephard ............ B23B 27/08 407/107 |
| 3,864,799 A | | 2/1975 | McCreery et al. |
| 4,233,867 A | | 11/1980 | Zimmerman |
| 4,674,802 A | * | 6/1987 | McKenna ............ E21B 10/54 299/112 R |
| 4,728,228 A | * | 3/1988 | Okunishi ............ B23C 5/207 407/35 |
| 5,516,242 A | | 5/1996 | Andronica |
| 5,755,815 A | | 5/1998 | Kochanek |
| 6,152,658 A | | 11/2000 | Satran et al. |
| 6,739,808 B1 | | 5/2004 | Ghosh |
| 7,578,638 B2 | | 8/2009 | Hessman et al. |
| 7,757,591 B2 | | 7/2010 | Trice et al. |
| 2007/0020057 A1 | | 1/2007 | Chen |
| 2013/0108384 A1 | * | 5/2013 | Yoshiba ............ B23B 27/065 407/114 |
| 2014/0248968 A1 | * | 9/2014 | Kojima ............ B23G 5/00 470/187 |

FOREIGN PATENT DOCUMENTS

| | | |
|---|---|---|
| CN | 203592161 | 5/2014 |
| DE | 1602795 | 4/1974 |
| DE | 2334661 | 1/1975 |
| DE | 2617455 | 11/1977 |
| DE | 2802395 | 7/1978 |
| DE | 19911 0738 | 12/1991 |
| DE | 102009027870 | 1/2011 |
| EP | 0388783 | 9/1990 |
| EP | 1537930 | 6/2005 |
| FR | 1254498 | 2/1961 |
| JP | 52106176 | 9/1977 |
| JP | 59042201 | 3/1984 |
| JP | 63131305 | 8/1988 |
| JP | 04310303 | 11/1992 |
| JP | 05116018 | 5/1993 |
| WO | 0015372 | 3/2000 |
| WO | 2006138120 | 12/2006 |

OTHER PUBLICATIONS

Written Opinion for International Appl. No. PCT/US2013/074915, dated Feb. 26, 2014, 8 pages.
English Translation of Chinese First Office action for CN201380073390.9, dated Jul. 26, 2016, 13 pages.

* cited by examiner

DUAL TIP CUTTER AND METHOD OF HARD TURNING

CROSS-REFERENCE TO RELATED APPLICATIONS

This application claims priority to U.S. Provisional Patent Application No. 61/739,176, filed Dec. 19, 2012, the entire contents of which are incorporated by reference herein.

BACKGROUND

The present invention relates to cutting tools for material removal machining equipment, for example, lathes used to perform turning operations. More particularly, the invention relates to a design for a dual tip cutter and a method of hard turning a work piece using a dual tip cutter.

Modern turning machines are routinely used for turning hardened steel components. Material removal rate of the truing process is of great economic impact on manufacturers' financial performance. Material removal rate is governed primarily by turning speed, feed rate, and cutting depth. Increasing turning speed significantly increases the heat generation at the cutting edge or tip, and is limited by temperature that the cutter is able to withstand. Increasing feed rate, on the other hand, has an adverse effect on surface finish of the work piece and is therefore confined to a range allowable by the surface finishing requirement. Increase cutting depth, however, increases chip load for the cutter, which significantly reduces cutter's service life and the productivity of the turning process.

As cutting depth increases, heavier load is generated at the tip of the cutting tool. It is accompanied by increasing amount of heat generation. This is more pronounced in the hard-turning process where the work piece is hardened to a hardness on the order of HRC 58 to 64. The excessive heat and high temperature cause coolant to evaporate before it reaches the cutting edge, making the cutter more susceptible to premature wear. To solve this problem, high pressure coolant systems were introduced for hard-turning processes. This resulted in prolonged service life of cutters. This process worked well for small to mid-sized work pieces. However, for large work pieces, such as windmill bearing rings, the increasing demand for cutting depth and service life imposes a greater challenge for cutters to be used in a hard-turning process.

SUMMARY

In one aspect, the invention provides a dual tip cutter. The dual tip cutter includes a body defining a feed direction, a cutting direction perpendicular to the feed direction, and a depth direction perpendicular to both the feed direction and the cutting direction. A first cutting portion is fixed relative to the body at a first end of the body. A second cutting portion is fixed relative to the body at the first end of the body adjacent the first cutting portion. The first and second cutting portions are stacked in the cutting direction so that the first cutting portion forms a leading cutting portion and the second cutting portion forms a trailing cutting portion for simultaneous cutting with the leading cutting portion. The second cutting portion extends from the body further in the depth direction than the first cutting portion. The relative position between the first cutting portion and the second cutting portion is set such that a total cutting load is shared between the first and second cutting portions in a predetermined ratio.

In another aspect, the invention provides a method of hard turning a work piece having a hardness value of at least HRC 58 to a smooth finished surface. A dual tip cutter is provided having a body defining a feed direction, a cutting direction perpendicular to the feed direction, and a depth direction perpendicular to both the feed direction and the cutting direction. The work piece is cut with a first cutting portion fixed relative to the body at a first end of the body. Simultaneous with the cutting of the first cutting portion, the work piece is cut with a second cutting portion fixed relative to the body at the first end of the body adjacent the first cutting portion. The first cutting portion leads the second cutting portion in the cutting direction, so that the first cutting portion removes a first amount of material from the work piece, and the second cutting portion removes an additional amount of material from the work piece. Prior to cutting, a relative positioning between the first cutting portion and the second cutting portion is determined so that the total cutting load will be distributed between the first and second cutting portions to achieve a predetermined partition ratio for the first cutting portion relative to the total chip load, and the relative positioning between the first cutting portion and the second cutting portion is set according to the determined relative positioning so that the predetermined partition ratio is achieved.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The cutter has multiple cutting edges and/or tips aligned along the cutting path. The cutting edges, from front to back or from top to bottom, assume progressively increasing depths. This allows the cutter to share chip load among its multiple cutting edges/tips. The total cutting depth is the sum of individual cutting depths of the multiple cutting edges/tips, which is significantly deeper compared with conventional single edge/tip cutters.

Figure 1:
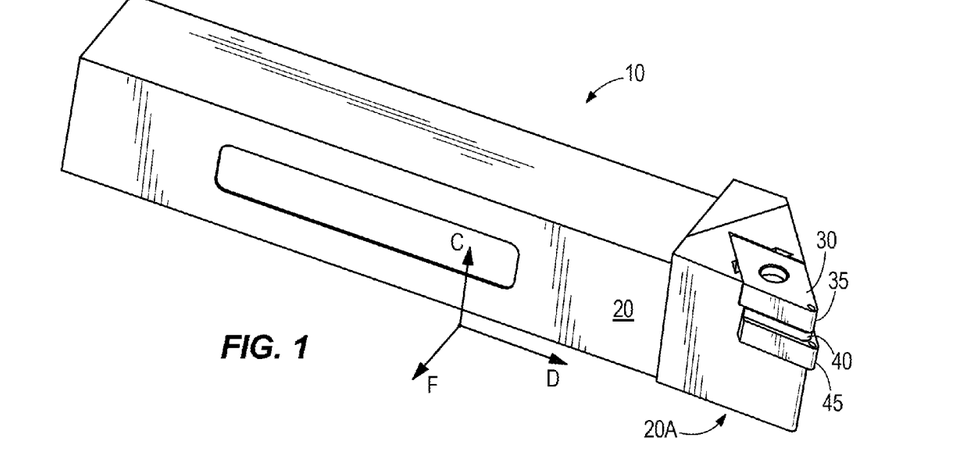
FIG. 1 is a perspective view of a cutting tool according to one construction of the invention.
Figure 2:
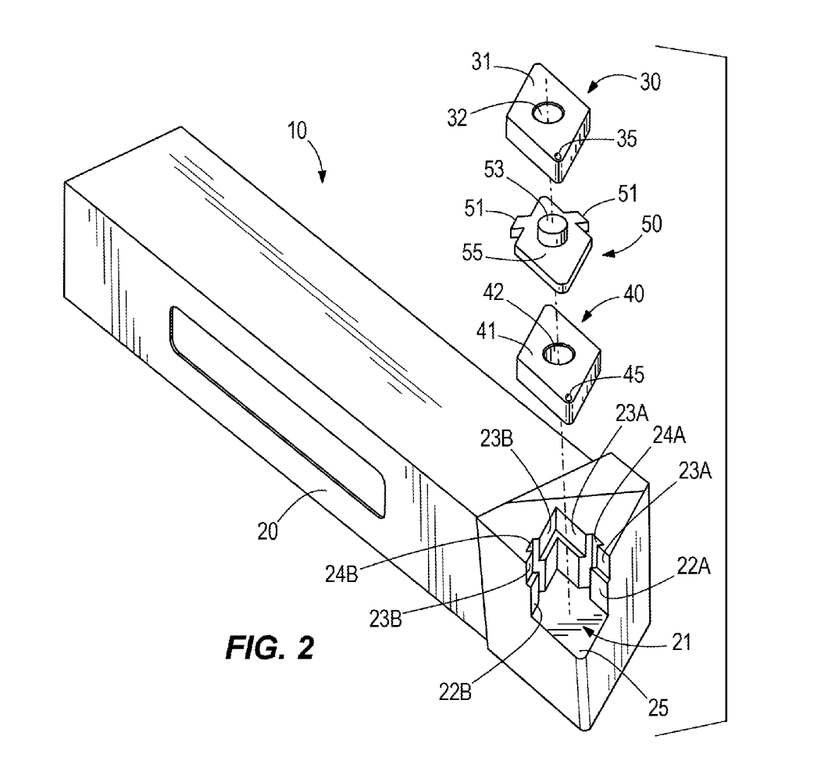
FIG. 2 is an exploded assembly view of the cutting tool of FIG. 1, including leading and trailing cutting inserts separated by a spacer.
Figure 3:
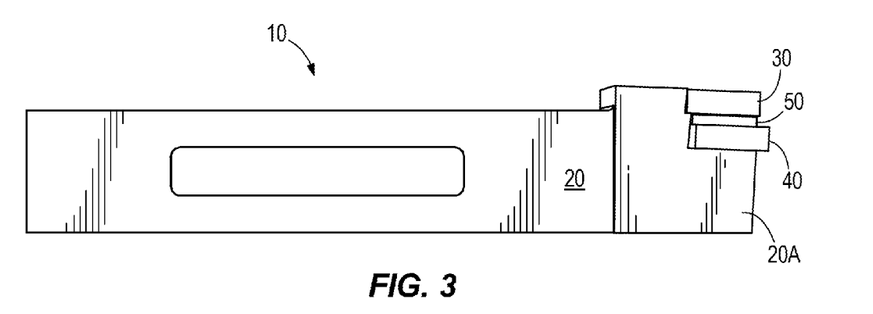
FIG. 3 is a side view of the cutting tool of FIG. 1, viewing along the feed direction.

FIGS. 1 and 2 show a cutting tool or simply "cutter" 10 according to one particular construction. The cutter 10 includes a body 20 and a plurality of cutting portions 35, 45 configured for simultaneous cutting of a work piece. As discussed further below, each of the cutting portions 35, 45 can include a rounded tip portion and an adjacent tangent edge portion. In the illustrated construction, the body 20 is provided as a tool holder, and the cutter 10 includes a set of inserts 30, 40 and a spacer 50 positioned between the inserts 30, 40. The tool holder 20 defines a feed direction F, a cutting direction C perpendicular to the feed direction F, and a depth direction D perpendicular to both the feed direction F and the cutting direction C. The body 20 has a first end 20A defining an opening 21 for receiving the inserts 30, 40 along with the spacer 50. The opening 21 has a set or sets of side walls 22A, 22B and 23A, 23B. The side walls 22A, 23A and the side walls 22B, 23B may form a stepped side wall or stepped side walls. On each stepped side wall, there is a groove 24A (or 24B) cut through vertically with respect to a bottom surface 25 of the opening 21. The inserts 30, 40 can be any type of inserts of diamond shape, each having a cutting portion 35, 45, a locating hole 32, 42, and parallel top and bottom surfaces 31, 41. The spacer 50 also has a diamond shape, including two ears 51 on the side and one or more pins 53 extending from opposed top and bottom surfaces 55.

The inserts 30, 40 are assembled into the opening 21 of the tool holder 20 with the second insert 40 at the bottom surface 25 of the opening 21, and the first insert 30 on top of the second insert 40. Thus, the first insert 30 faces the cutting direction C to form a leading cutter while the second insert 40 is generally behind the first insert 30 in the cutting direction C to form a trailing cutter. The spacer 50 is sandwiched between the first insert 30 and the second insert 40, with the pins 53 inserted inside of the locating holes 32, 42 of the respective inserts 30, 40. The side of first insert 30 is abutted firmly against the side walls 23A and 23B of the tool holder 20. Similarly, the side of the second insert 40 is abutted firmly against the side wall 22A and 22B of the tool holder 20. The ears 51 of the spacer 50 are slidably positioned inside of the groove 24, parallel to the cutting direction C. The inserts 30 and 40, and the spacer 50 therebetween are clamped down firmly against the bottom surface 25 of the tool holder 20.

Figure 9A:
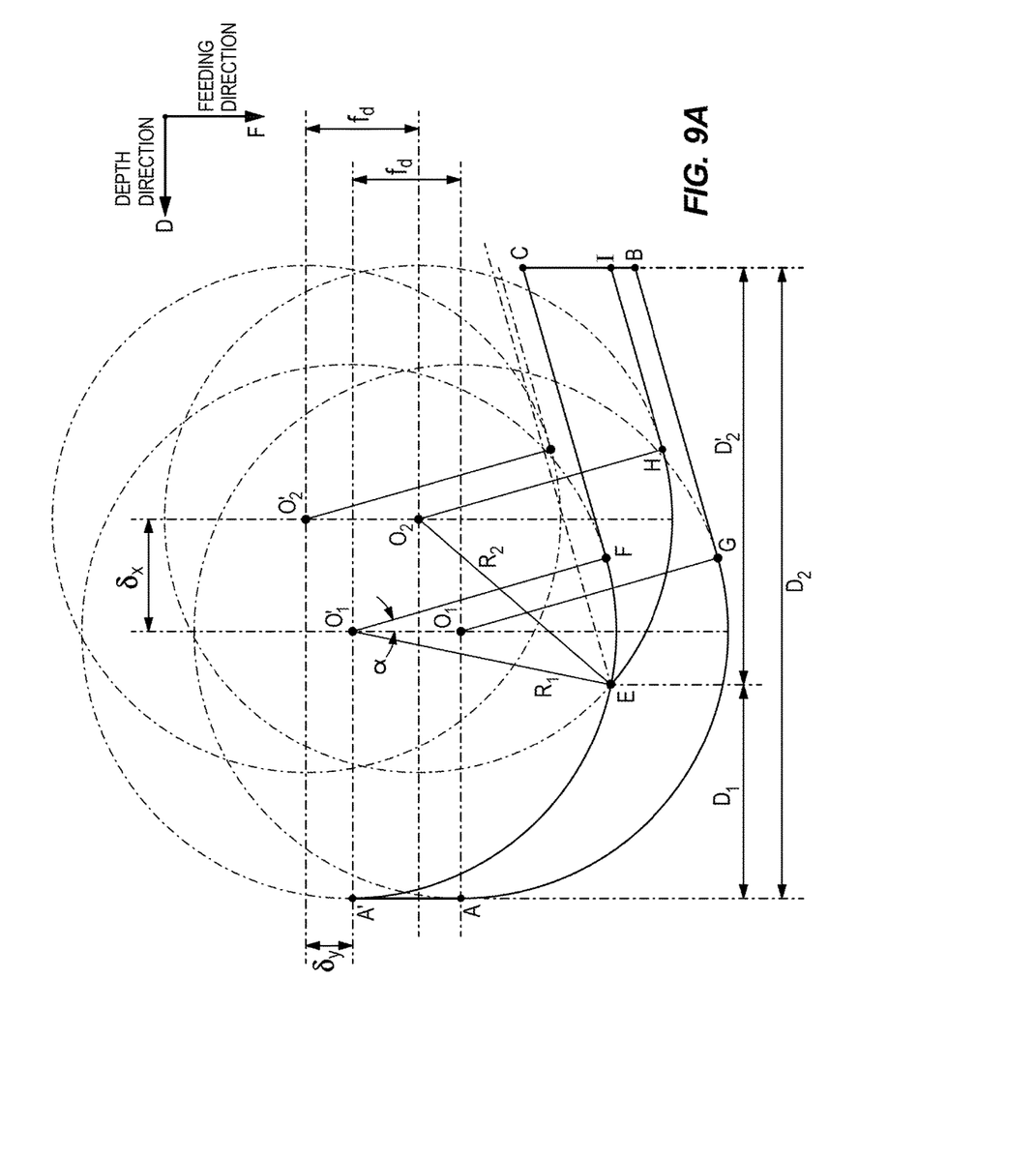
FIGS. 9A, 9B, and 10A are views along the cutting direction of the geometries of the leading and trailing cutting portions as overlaid atop one another.
Figure 9B:
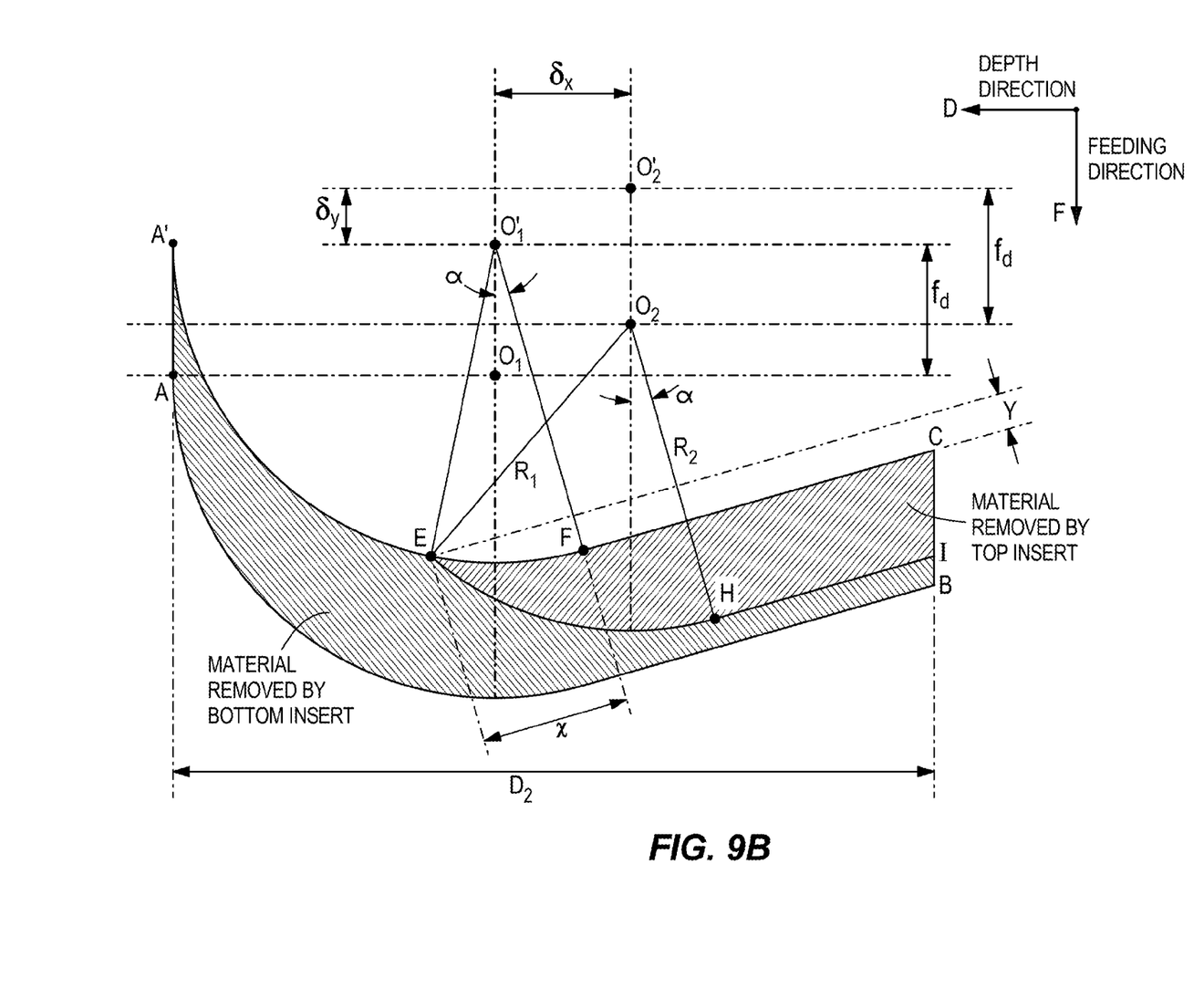

As shown in FIGS. 1, 9A, and 9B, in the assembled position, the second insert 40 extends outward from the tool holder 20 past the first insert 30 in both the depth direction D and the feeding direction F. In the illustrated construction, the upper surfaces 31, 41 of the inserts 30, 40 are tangent to the same sphere centered at a point on the rotational axis A-A of the work piece 60. This requires that the top and bottom surfaces 55 of the spacer 50 are not parallel, but rather are at a small angle to each other. In some constructions, this angle may be substantially close to zero (e.g., less than about 2 degrees).

More inserts can also be adopted in the manner described above. In addition, the first and second inserts 30, 40 and the spacer 50 can be integrated as a single dual-tip insert.

Figure 4:
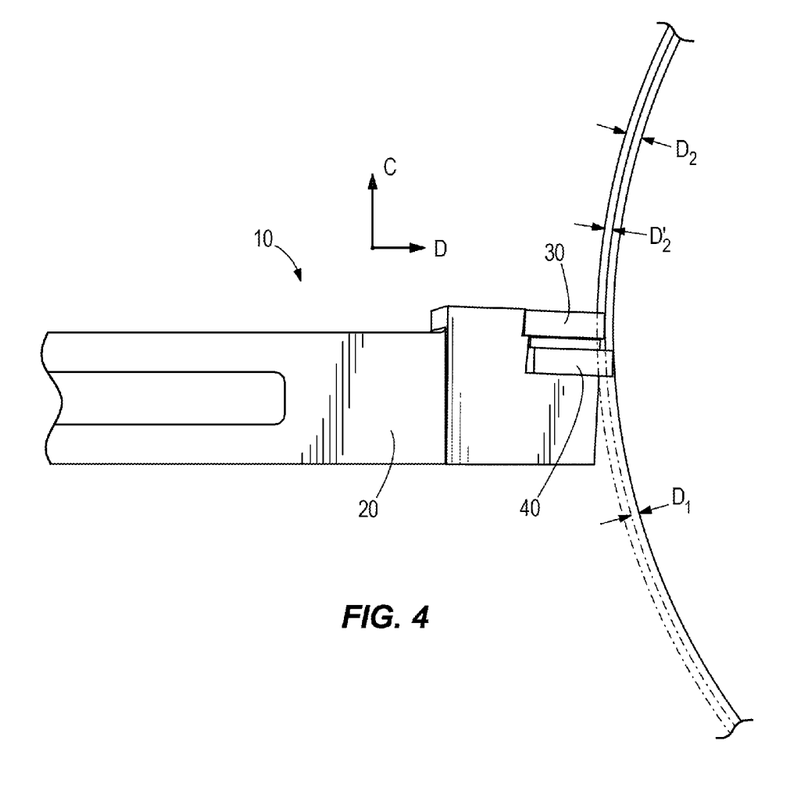
FIG. 4 is a side view of the cutting tool cutting a rotating work piece.
Figure 5A:
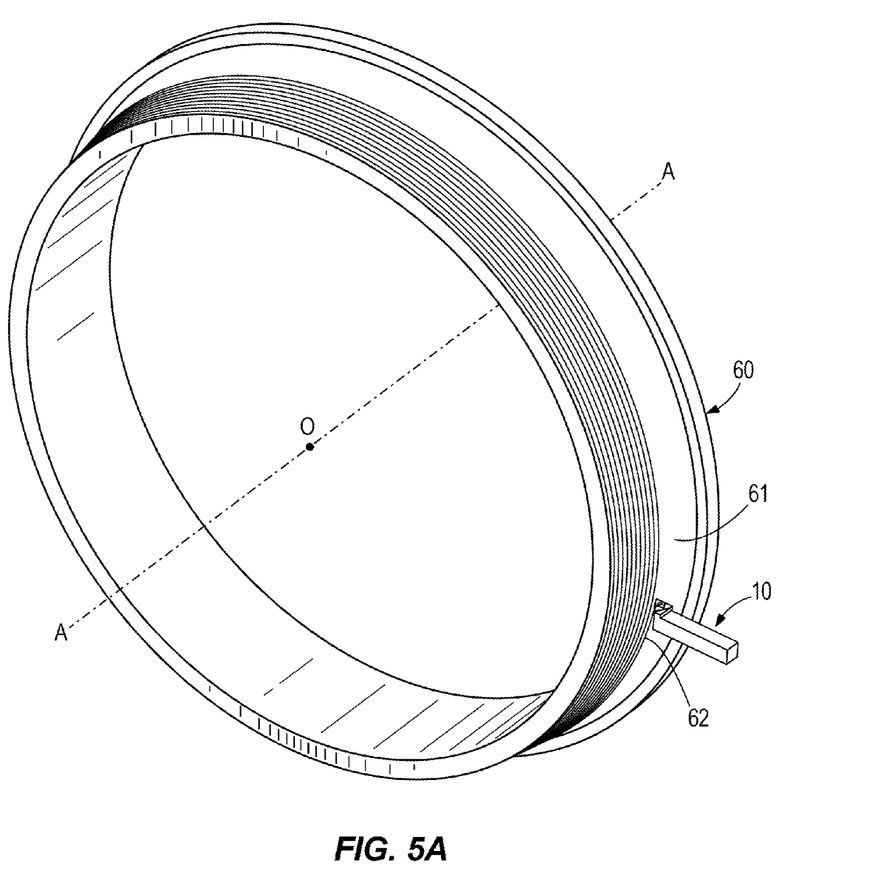
FIG. 5A is a perspective view of the cutting tool cutting the work piece.
Figure 5B:
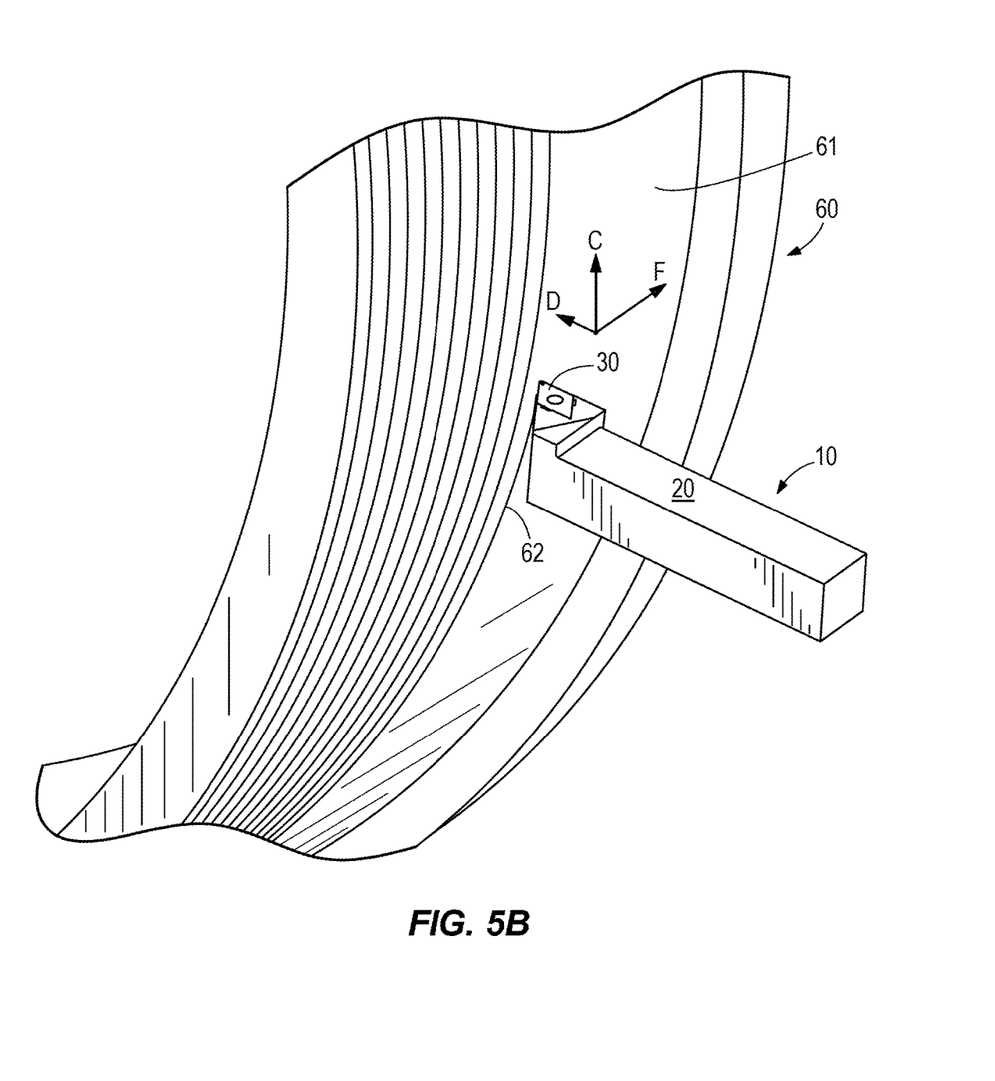
FIG. 5B is a detail view of the cutting tool cutting the work piece.

When the cutter 10 is brought to engagement with the work piece 60, as shown in FIGS. 4 and 5, a helical cutting path 62 is created on the machining surface 61 of the work piece 60 as a product of the rotation of the work piece 60 and the feed rate of the cutter 10 along the feed direction F. With this understanding, the cutting direction C will be referred to as the "nominal" cutting direction C, as the cutting direction with respect to the work piece 60 follows the helical path 62. The helical cutting path 62 overlaps on itself, generating a smooth turning surface. The cutting portion 35 of the leading insert 30 is shown in FIGS. 9A and 9B as including a tip segment EH and a cutting edge segment HI tangent to the cutting tip segment EH. The cutting tip EH of the leading insert 30 has a radius $R_2$, and is centered at point $O_2$. The cutting portion 45 of the trailing insert 40 is shown in FIGS. 9A and 9B as including a tip segment AG and a cutting edge segment GB tangent to the cutting tip segment AG. The cutting tip segment AG of the trailing insert 40 has a radius $R_1$ and is centered at point $O_1$. It should be noted that $O_1'$ and $O_2'$ are the same as points $O_1$ and $O_2$, but simply representative of the tool being positioned at a different location along the feed direction F.

Figure 6:
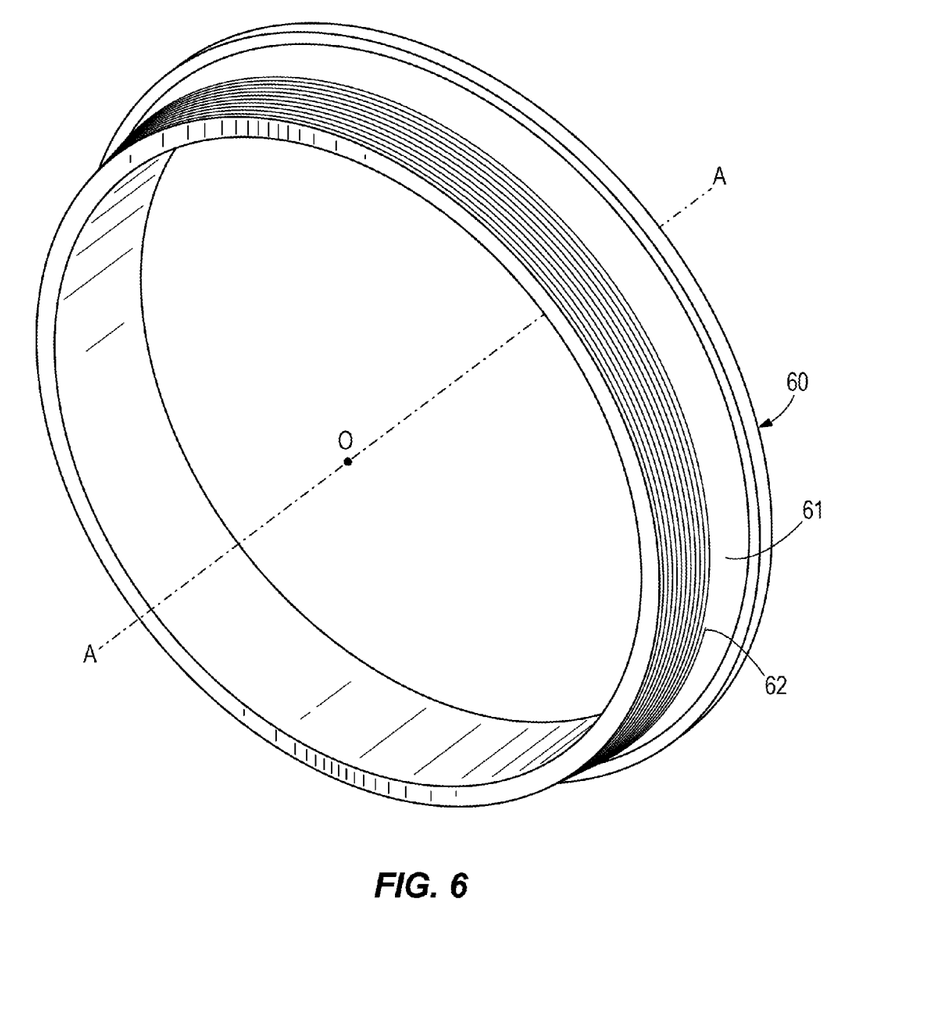
FIG. 6 is a perspective view of the work piece.

Projecting the two cutting portions 35, 45 to a common plane viewing along the cutting direction C as shown in FIGS. 9A and 9B illustrates that the center $O_2$ for the tip segment EH of the leading cutting portion 35 is offset from the center $O_1$ of the tip segment AG of the trailing cutting portion 45 by δx in the depth direction D and by δy in the feeding direction F. The cutting portions 35 and 45 of the inserts 30 and 40 are arranged a small distance apart along the helical cutting path 62 (see FIG. 6) and offset from each other in both feeding and depth directions F, D. As a consequence, the leading insert 30 removes a first layer of the material at depth of $D'_2$ from the surface 61, and the trailing insert 40 removes a second layer of the material at depth of $D_1$ from the surface 61 along the same cutting path 62. This results in a total cutting depth of $D_2=D_1+D'_2$. Partitioning between $D_1$ and $D'_2$ can be adjusted by changing δx and δy to achieve any desirable cutting configuration that produces the longest service time, the best surface finishing or the highest possible material removal rate. In practice, it may be desired to partition $D_1$ and $D'_2$, and to select the inserts 30 and 40 such that the leading insert 30 is used for rough cutting, removing a thicker layer of material, and the trailing insert 40 is used for finishing cutting, removing a thinner layer of material for enhanced surface finishing quality. It should be understood that the inserts 30 and 40 need not be identical. In fact, it may be preferred in some constructions that the cutting portions 35, 45 of the inserts 30 and 40 are different in at least one of material type, shape, and radius to achieve particular desired effects.

Although horizontally-stacked cutters (i.e., side-by-side in the feed direction F) might generally be considered to have separate "leading" and "trailing" cutting portions along a helical cutting path as a work piece is rotated and the cutting tool is fed in direction, the spacing distance along the helical cutting path in such circumstances is substantially equal to a circumference of the work piece. On the other hand, the cutting tool 10 described and illustrated herein has the cutting portions 35, 45 separated along the helical cutting path 62 by a distance substantially smaller than the circumference of the work piece 60. The spacing distance between the cutting portions 35, 45, as measured along the cutting path 62 may be less than about 10 percent of the circumference of the work piece 60. Thus, the two cutting portions 35, 45 make substantially one shared cut, with shared chip load, whereas cutters spaced in a feed direction make substantially separate cuts altogether. Despite the small spacing between the first and second cutting portions 35, 45 along the cutting path 62, an adequate chip escape route is provided. The optimal spacing distance may depend upon the conditions of a given cutting operation.

The chip load that each of the cutting portions 35, 45 carries is in an approximate proportion to the cross-sectional area, perpendicular to the nominal cutting direction C, of cutting chip (FIG. 9B). Assuming the cross-sectional area of a cutting chip from the leading insert 30 is $A_2$, and the cross-sectional area of a cutting chip from the trailing insert 40 is $A_1$, the total area is $A=A_1+A_2$. The chip load partition ratio for the leading insert 30 is $K=A_2/A$, which is calculated as $$K = \frac{R_2^2}{4f_d D_2}(\gamma_2 - \sin\gamma_2) - \frac{R_1^2}{4f_d D_2}(\gamma_1 - \sin\gamma_1) - \frac{y}{D_2}$$
$$\left[\frac{\delta_x}{f_d}\cos\alpha - \left(1 - \frac{\delta_y}{f_d}\right)\sin\alpha\right] + \left[\frac{R_2 - R_1}{f_d} + \frac{\delta_x}{f_d}\sin\alpha + \left(1 - \frac{\delta_y}{f_d}\right)\cos\alpha\right]$$
$$\left[\frac{D_2 - R_1 - \delta_x}{D_2\cos\alpha} + \frac{f_d - \delta_y}{2D_2}\sin\alpha - \frac{R_2 + R_1 - \delta_x}{2D_2}\tan\alpha\right]$$

where $$\gamma_1 = 2\mathrm{Arccos}\left(1 - \frac{y}{R_1}\right); \gamma_2 = 2\mathrm{Arccos}\left(\frac{R_1 - y - (f_d - \delta_y)\cos\alpha - \delta_x\sin\alpha}{R_2}\right)$$

In above equations, y is the positive root of the following equation set $$\begin{cases}(y - R_1)^2 + x^2 = R_1^2 \\ \left(\frac{y + (f_d - \delta_y)\cos\alpha + }{\delta_x\sin\alpha - R_1}\right)^2 + \left(\frac{x + \delta_x\cos\alpha - }{(f_d - \delta_y)\sin\alpha}\right)^2 = R_2^2\end{cases}$$

As can be appreciated, the chip load partition ratio K is a function of feed rate $f_d$ for a given set of cutter geometry parameters $R_1$, $R_2$ and cutting depth $D_2$.

For preferred chip load sharing, δx and δy may be set such that K is close to K=0.5. As a practical matter, any K value ranging from 0.25 to 0.75 may be acceptable (K=0.25 to 0.75).

To maximize the total cutting depth while minimizing the chip load for both inserts 30, 40, the cutting tip radius $R_2$ of the leading insert 30 may be equal to or smaller than the cutting tip radius $R_1$ of the trailing insert 40.

Figures 10A, 10B:
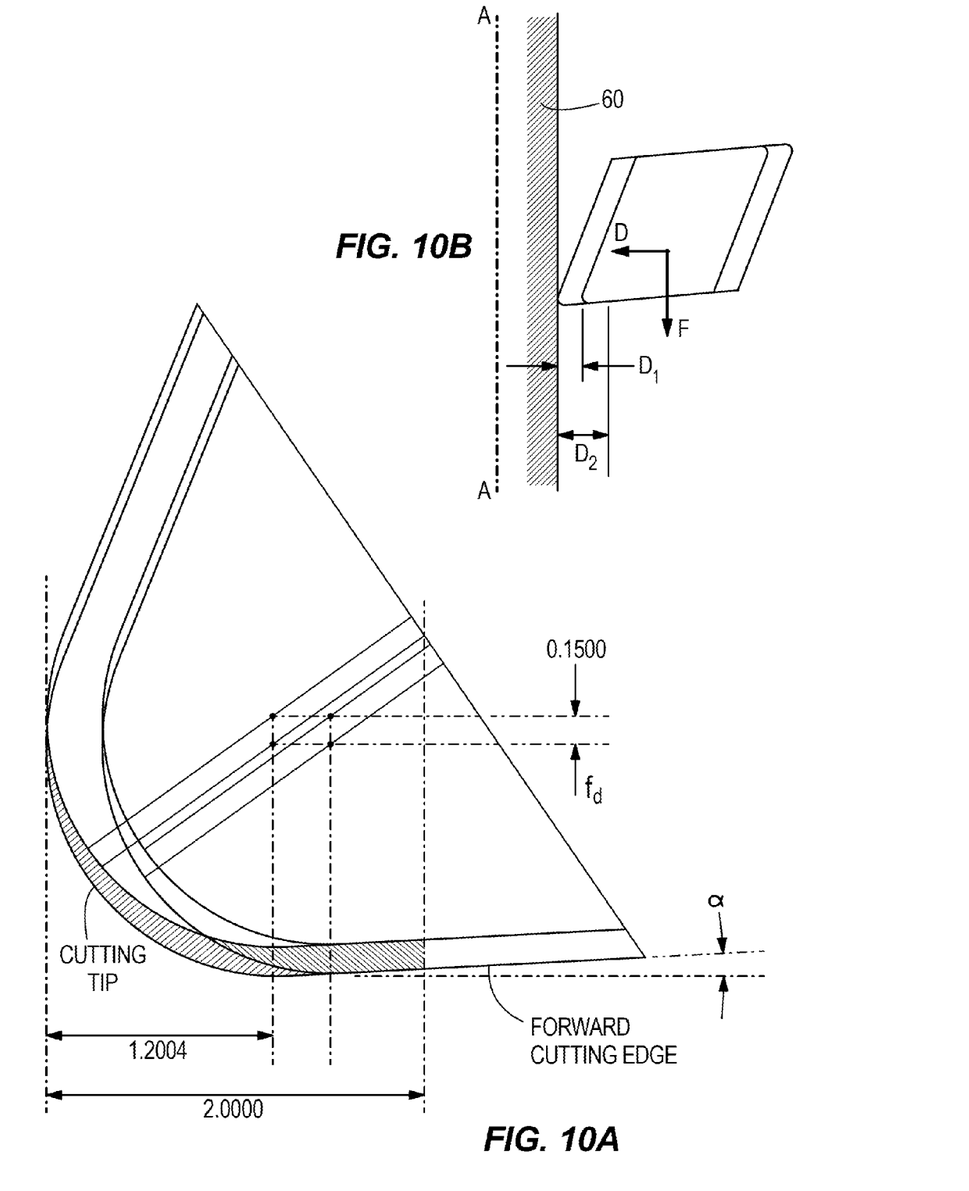
FIG. 10B is a top view illustrating a vertical alignment of the forward cutting edges of two cutting inserts.

In order to have approximately the same cutting length for the cutting portions 35, 45 of the leading and trailing inserts 30, 40, the expression $R_1-R_2+\delta_y \cos\alpha-\delta_x \sin\alpha$ may be set to zero. This aligns the cutting edges HI, GB (the forward edges in the feed direction F) of the leading and trailing inserts 30, 40 in a plane that is perpendicular to the plane defined by the depth direction D and the feeding direction F (see FIG. 10B). Herein, this is referred to as vertical alignment for convenience, as it is assumed that the depth and feed directions D, F (and the work piece rotation axis A-A) are substantially horizontal and the nominal cutting direction C is substantially vertical.

In accordance with the above equations, one can predetermine a desired ratio K of chip load sharing between the first and second cutting portions 35, 45 and set a relative position between the first and second cutting portions 35, 45 to achieve the predetermined ratio K. Additional flexibility for repeated reconfiguring of the relative positioning between first and second cutting portions 35, 45 is provided by a variant shown in FIG. 7 and described below.

Figure 7:
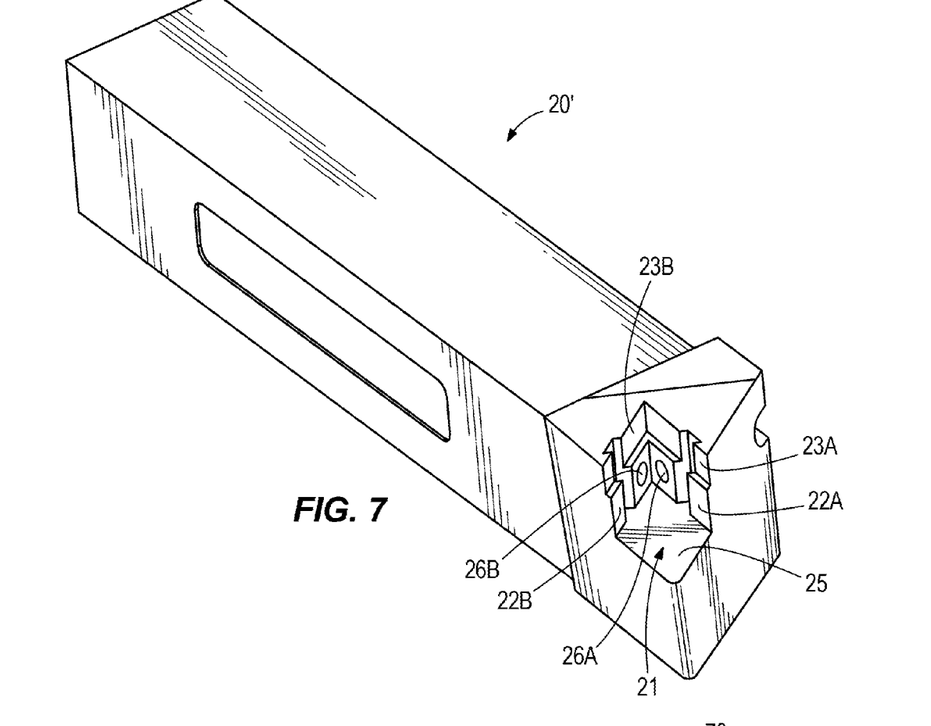
FIG. 7 is a perspective view of an alternate tool holder for the cutter, in which an adjusting device for one of the cutting inserts is provided in the cutting insert-receiving opening.

FIG. 7 shows a variant of the cutter 10, including an alternate body or tool holder 20' with at least one adjusting device for variably adjusting the positioning between the leading insert 30 and the trailing insert 40. This enables a variety of cutting edge settings to be achieved, such as those described above. In the illustrated construction, the adjusting device includes two threaded holes 26A and 26B made at the bottom portion of the side walls 22A, 22B for receiving two set screws (not shown). In this variant of the tool holder 20', the opening 21 can be formed of a bottom wall 25 and either stepped walls (22A, 22B, 23A, 23B) as previously described, or alternatively, straight walls. When separate inserts 30, 40 are used, the extension of the cutting portion 45 of the trailing insert 40 beyond the cutting portion 35 of the leading insert 30, indicated as δx and δy, can be adjusted in a continuously variable manner by rotating the two set screws to protrude a desired amount from the adjacent side wall 22A, 22B, forming an abutment that positions the trailing insert 40. If desired, an adjusting device as described above can be adapted for positioning the leading insert 30.

Aligning multiple cutting tips and edges along the cutting path 62 requires the inserts 30 and 40 to be offset slightly rather than vertically aligned in the nominal cutting direction C. The device shown in FIG. 7 is adjustable to achieve this purpose. In practice, it is often simpler to align the forward cutting edges HI, GB vertically in the nominal cutting direction C. In other words, the forward cutting edges HI, GB have zero offset from a vertical line. This arrangement has advantages in chip load sharing, in cleaning under cuts and in having consistent surface finish across the entire cutting surface, from beginning to end.

It is also possible to have the tool holder 20 statically or dynamically rotatable about an axis such that said offset of the inserts 30, 40 from the vertically-aligned position can be adjusted on demand in accordance with the desired feed rate and actual load sharing conditions. For example, at beginning, the inserts 30, 40 can be aligned vertically in the nominal cutting direction C, then the alignment angle may change slightly following the actual helical cutting path 62, and then finally the alignment angle may change back to its beginning position. This not only achieves desired chip load sharing but also leaves no transitional zone at beginning and end finished surface areas.

Figure 8:
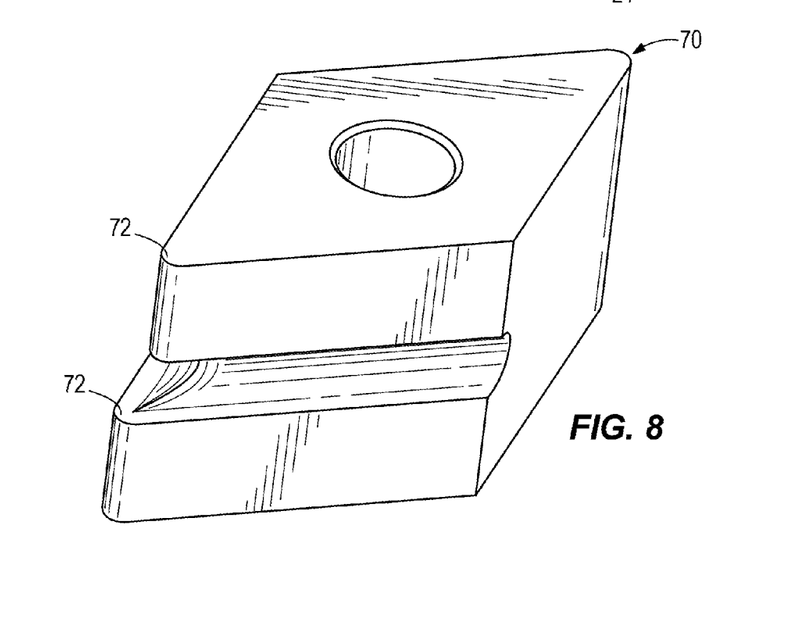
FIG. 8 is a perspective view of an alternate cutting insert including multiple integrated cutting portions.

FIG. 8 shows as an example of a cutting insert 70 having multiple integrated cutting portions 71, 72 (each having a cutting tip and a cutting edge similar to the combined pair of inserts 30, 40). A multi-cutter insert 70 can be custom made to suit the needs of a particular turning application. The cutting portions 71, 72 are arranged with a predetermined fixed offset (e.g., an offset as described above with respect to the separate inserts 30, 40) for engaging the work piece 60 and cutting simultaneously as the work piece 60 is rotated. As described above, distinct first and second layers of material can be removed by the respective cutting portions 71, 72. In the cutting process, the two cutting portions 71, 72 can be aligned substantially along the forward side (leading in the feed direction F) of the cutting path 62 for sharing and thus reducing the chip load on each cutting portion.

It should be understood that the cutter of the current invention can be used to cut any materials, hardened or unhardened, and for a host of products, including but not limited to bearings, without deviating from the spirit of current invention. Although not strictly required, the cutting tool 10 can be used by feeding the tool 10 along a substantial section of the work piece 60 (e.g., a majority section of the work piece 60 in the feed direction F) to remove material from the work piece 60, in continuously overlapping cutting passes, leaving a smooth finished surface.

Those of skill in the art will appreciate other possible variants and/or embodiments. They shall be considered under the scope of the current invention.

The invention claimed is:

1. A dual tip cutter comprising:
    a body defining a feed direction, a cutting direction perpendicular to the feed direction, and a depth direction perpendicular to both the feed direction and the cutting direction;
    a first cutting portion fixed relative to the body at a first end of the body; and
    a second cutting portion fixed relative to the body at the first end of the body adjacent the first cutting portion,
    wherein the first and second cutting portions are stacked in the cutting direction so that the first cutting portion forms a leading cutting portion and the second cutting portion forms a trailing cutting portion for simultaneous cutting with the leading cutting portion, the second cutting portion extending from the body further in the depth direction than the first cutting portion,
    wherein a relative position between the first cutting portion and the second cutting portion is set such that a total chip load is shared between the first and second cutting portions, and
    wherein cutting edges of each of the first and second cutting portions that are forward in the feed direction are aligned in a plane parallel to the cutting direction.

2. The dual tip cutter of claim 1, wherein the first and second cutting portions are provided by separate cutting inserts coupled to the body, the dual tip cutter further comprising an adjusting device for adjusting a relative position between the respective cutting portions of the first and second cutting inserts.

3. The dual tip cutter of claim 2, wherein the adjusting device is configured to adjust the relative position between the first and second cutting portions in a continuously variable manner.

4. The dual tip cutter of claim 3, wherein the cutting insert having the first cutting portion is fixed relative to the body, and the adjusting device is operable on the cutting insert having the second cutting portion.

5. The dual tip cutter of claim 2, wherein the adjusting device includes a pair of set screws received in a corresponding pair of threaded apertures provided in adjacent side walls of an opening of the body receiving the first and second cutting inserts.

6. The dual tip cutter of claim 1, wherein the body is rotatable about an axis so that a relative alignment between the first and second cutting portions with respect to a work piece can be varied on demand.

7. The dual tip cutter of claim 1, wherein the first and second cutting portions are substantially identical.

8. The dual tip cutter of claim 1, wherein the first and second cutting portions are different in at least one of material type, shape, and radius.

9. The dual tip cutter of claim 1, wherein the first and second cutting portions are integrally-formed as parts of a single, multi-cutter insert so that a relative position between the first cutting portion and the second cutting portion is fixed.

10. A method of hard turning a work piece having a hardness value of at least HRC 58 to a smooth finished surface, the method comprising:
    providing a dual tip cutter having a body defining a feed direction, a cutting direction perpendicular to the feed direction, and a depth direction perpendicular to both the feed direction and the cutting direction;
    setting a relative positioning between a first cutting portion fixed relative to the body at a first end of the body and a second cutting portion fixed relative to the body at the first end of the body adjacent the first cutting portion;
    cutting the work piece with the first cutting portion; and
    cutting the work piece, simultaneously with the cutting of the first cutting portion, with the second cutting portion, with the first cutting portion leading the second cutting portion in the cutting direction, wherein the first cutting portion removes a first amount of material from the work piece, and the second cutting portion removes an additional amount of material from the work piece so that the total chip load is distributed between the first and second cutting portions according to a partition ratio,
    wherein cutting edges of each of the first and second cutting portions that are forward in the feed direction are aligned in a plane parallel to the cutting direction.

11. The method of claim 10, wherein setting the relative positioning between the first cutting portion and the second cutting portion includes adjusting a relative position between the first cutting portion and the second cutting portion.

12. The method of claim 11, wherein adjusting the relative position between the first cutting portion and the second cutting portion includes adjusting the position of the second cutting portion relative to the body.

13. The method of claim 12, wherein adjusting the position of the second cutting portion relative to the body includes rotating one or more set screws providing an adjustable abutment between the second cutting portion and the body.

14. The method of claim 10, further comprising rotating the body about an axis to alter the alignment between the first and second cutting portions.

15. The method of claim 10, wherein cutting the work piece with the first and second cutting portions includes making continuously overlapping helical cutting passes with the dual tip cutter as the work piece is rotated about a central axis, and the dual tip cutter is fed in the feed direction parallel to the central axis.

16. The method of claim 10, wherein the partition ratio for the first cutting portion relative to the total chip load is between 0.25 and 0.75.

17. The method of claim 10, wherein the partition ratio for the first cutting portion relative to the total chip load is 0.5.

18. The method of claim 10, wherein setting the relative positioning between the first cutting portion and the second cutting portion includes selecting a single, integral multi-cutter insert having a fixed relative position of the first and second cutting portions.

* * * * *